(12) United States Patent
Vorobyov et al.

(10) Patent No.: US 10,825,244 B1
(45) Date of Patent: Nov. 3, 2020

(54) AUTOMATED LOD CONSTRUCTION FOR POINT CLOUD

(71) Applicant: ARVIZIO, INC., Ottawa (CA)

(72) Inventors: Borys Vorobyov, Ottawa (CA); Oleksandr Karpenko, Ottawa (CA); Iurii Monastyrov, Ottawa (CA); Ievgenii Bielkin, Ottawa (CA); Vitalii Monastyrov, Ottawa (CA)

(73) Assignee: Arvizio, Inc., Ottawa (CA)

( * ) Notice: Subject to any disclaimer, the term of this patent is extended or adjusted under 35 U.S.C. 154(b) by 36 days.

(21) Appl. No.: 16/182,020

(22) Filed: Nov. 6, 2018

Related U.S. Application Data

(60) Provisional application No. 62/582,532, filed on Nov. 7, 2017.

(51) Int. Cl.
| | | |
|---|---|---|
| *G06T 19/00* | (2011.01) | |
| *G06T 7/50* | (2017.01) | |
| *G06F 7/58* | (2006.01) | |
| *G06F 16/51* | (2019.01) | |
| *G06F 7/552* | (2006.01) | |
| *G06F 16/22* | (2019.01) | |

(52) U.S. Cl.
CPC ............. *G06T 19/00* (2013.01); *G06F 7/552* (2013.01); *G06F 7/582* (2013.01); *G06F 16/2219* (2019.01); *G06F 16/51* (2019.01); *G06T 7/50* (2017.01); *G06T 2207/10028* (2013.01); *G06T 2210/36* (2013.01)

(58) Field of Classification Search
CPC . G06T 19/00; G06T 7/50; G06T 2207/10028; G06T 2210/36; G06F 16/51; G06F 16/2219; G06F 7/552; G06F 7/582
See application file for complete search history.

(56) References Cited

U.S. PATENT DOCUMENTS

| | | | | |
|---|---|---|---|---|
| 9,600,929 | B1* | 3/2017 | Young | G06T 17/00 |
| 9,754,405 | B1* | 9/2017 | Young | G06T 17/005 |
| 9,792,734 | B2* | 10/2017 | Kara | G06T 17/10 |
| 2006/0012597 | A1* | 1/2006 | Chakraborty | G06K 9/6211 |
| | | | | 345/419 |
| 2007/0262988 | A1* | 11/2007 | Christensen | G06T 15/08 |
| | | | | 345/424 |
| 2013/0202197 | A1* | 8/2013 | Reeler | G01S 17/89 |
| | | | | 382/154 |
| 2014/0198097 | A1* | 7/2014 | Evans | G06T 17/00 |
| | | | | 345/419 |
| 2018/0315232 | A1* | 11/2018 | Jones | G06T 15/005 |
| 2018/0330480 | A1* | 11/2018 | Liu | G06T 17/205 |
| 2019/0045157 | A1* | 2/2019 | Venshtain | H04N 7/147 |
| 2019/0197786 | A1* | 6/2019 | Molyneaux | G06T 15/08 |
| 2020/0013217 | A1* | 1/2020 | Venshtain | H04L 65/604 |

* cited by examiner

*Primary Examiner* — Yu Chen
(74) *Attorney, Agent, or Firm* — Aventum IP Law LLP (57) ABSTRACT

A method of providing structured data to be used in a front end viewing device includes building a plurality of layers with different levels of detail (LODs). The method utilizes a point cloud, and selects points into the LODs on random basis. The data sets associated with the LODs are complementary, so that the data may be combined in order to achieve higher resolution. The method maintains or reduces the size of the resulting LOD-structured file(s) in comparison with the original file(s) of the cloud.

13 Claims, 5 Drawing Sheets

AUTOMATED LOD CONSTRUCTION FOR POINT CLOUD

CROSS-REFERENCE TO RELATED APPLICATIONS

The present invention claims priority from U.S. Provisional Patent Application Ser. No. 62/582,532 filed on Nov. 7, 2017, the entire contents of which are incorporated herein by reference.

TECHNICAL FIELD

The present disclosure relates generally to methods and devices for visualizing images and, more particularly, to methods and devices for processing very large amounts of visual data.

BACKGROUND OF THE INVENTION

Visualization of large amounts of data presents a variety of technical problems, in particular due to memory and processor limitations of front-end visualization devices. Memory and processor limitations become especially critical for point clouds—data produced mostly by laser scanners—as a number of points in point clouds may reach tens of billions. In many applications, an image provided to a user depends on the user's position and orientation relative to the scene. In particular, more remote portions of a scene may be shown with less detail, while those closer to the user are shown in more detail. Additionally, when the user moves, the image is expected to change in accordance with their movements. Therefore, there is a need for efficient and flexible methods for displaying large scale images and, in particularly, organizing data for dynamic display of those images.

SUMMARY OF THE INVENTION

A computer-implemented method is provided, comprising: providing a plurality of data points representing a scene. The plurality of data points is stored in computer readable memory, and is associated with a volume, and wherein each of the plurality of data points is within the volume.

The method comprises forming a bearing layer comprising a plurality of groups of data points stored in computer readable memory. Each group is associated with the bearing layer and comprises some points from the plurality of data points, wherein each of the plurality of groups is associated with a voxel of the volume; the voxel associated with the bearing layer. Each point of said group is within the voxel.

The method comprises forming a plurality of point sets, each set stored in computer memory and associated with one of a plurality of levels of detail (LODs). For a particular LOD: the point set associated with said LOD comprises a plurality of groups of data points, each group associated with said LOD. Each of the plurality of groups is associated with a voxel of the volume, the voxel associated with said LOD. Each point within said group is within the voxel.

A number of voxels associated with one of the plurality of LODs is different from a number of voxels associated with another of the plurality of LODs. For each two sequential LODs of the plurality of LODs, at least some of the voxels associated with one of the two LODs each is associated with a same portion of the volume as two or more voxels adjacent to one another and associated with another of the two LODs.

In one aspect of the method, forming a point set associated with a particular LOD comprises random or pseudo-random selection of points from groups of data points associated with the bearing layer into the groups of data points associated with said LOD.

In one aspect of the method, the pluralities of voxels associated with the plurality of LODs form a pyramid, and each of inner voxels of the pyramid is associated with a same portion of the volume as eight voxels associated with a LOD different from the LOD associated with said inner voxel.

The random or pseudo-random selection of points into a particular group of data points may include selection of no more points than a predefined number of points, same number for all groups and all LODs.

DETAILED DESCRIPTION OF EXEMPLARY EMBODIMENTS

Figure 1:
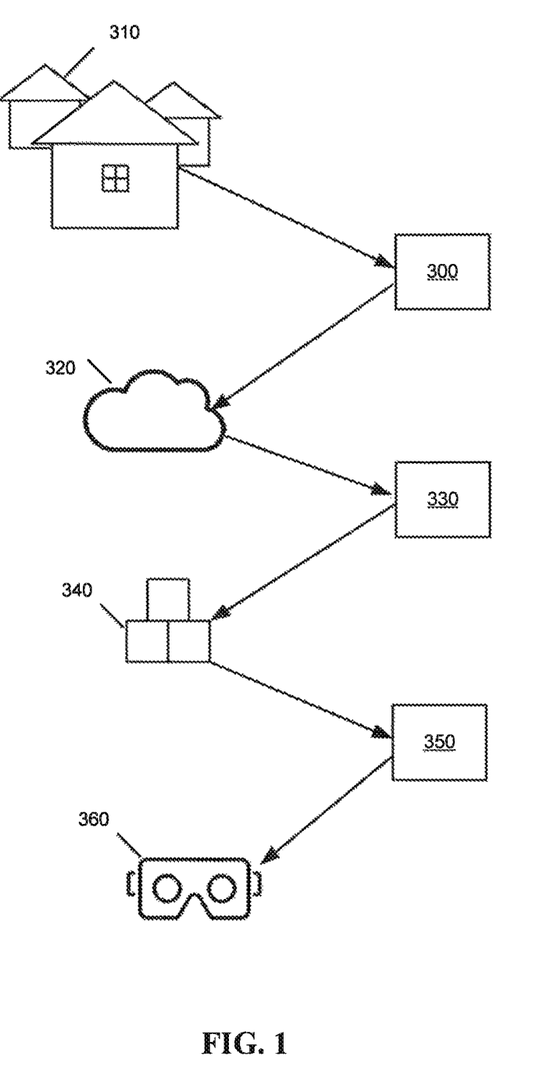
FIG. 1 is a schematic representation of a scenario where the method disclosed herein may be used.

The method disclosed herein may be used for displaying an image in a visualization device such as virtual reality glasses, for example in the scenario illustrated in FIG. 1. One or more scanners 300 scan a scene 310 and store scanned data in a point cloud 320 in computer readable memory. The arrows in FIG. 1 illustrate the flow of data. A computer system 330, including one or more hardware processors, reads the cloud data 320 and structures it as disclosed herein, into a plurality of layers 340 with different levels of detail. The structured data 340 is stored in computer readable memory. An image of the scene 310 is displayed in the viewing device 360 using portions of the structured data 340 selected by a computer 350, which may be a separate computer with one or more hardware processors, or part of the viewing device. The computer system 330 and computer 350 may include one or more general purpose or specialized computers, as well as mobile devices such as smart phones.

A point cloud may be understood as a set of points representing a particular scene. The points may be irregularly distributed within a particular volume. Various semantic data (color, intensity etc.) may be associated with each point. A variety of techniques may be employed to produce a point cloud, such as laser scanning or photogrammetry data.

The number of points in a cloud P may be several millions or billions of points. By way of example, a cloud includes from 10 million to 10 billion points.

The points in the exemplary cloud have coordinates for identifying a position of each point within the scene. In a three-dimensional space, Cartesian coordinates (X,Y,Z are used to define the points, with a volume containing the cloud defined by ($\Delta X$, $\Delta Y$, $\Delta Z$). If d is the dimensionality of the cloud, an extent of the volume along each coordinate $\Delta X_i$ (i=1 ... d) may be found by calculating min and max values of the coordinate among all the points of the cloud. Alternatively, another co-ordinate system is used.

The cloud points are associated with values related to the visual or other image presented to the user. The values relate to aspects such as visible light and/or color intensity, intensity of any other radiation reflected/emitted by the scene, or another aspect sensed in forming the point cloud. By way of example, the data associated with the points is such that it can be used for forming an infrared image of the scene. The values associated with each point are scalars. Alternatively, the values are vectors, matrices, or other structures.

Figure 2:
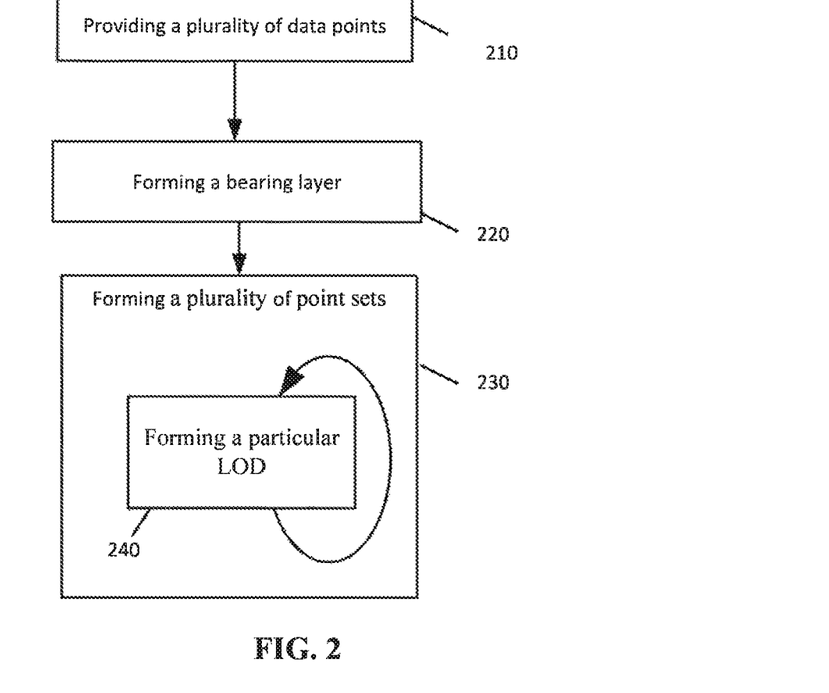
FIG. 2 is a flow chart of a method for structuring point cloud data.

The present embodiment is described for the situation where the point cloud is used for presenting the scene with a viewing device. With reference to FIG. 1, the computer system 330 forms structured data for forming an image of the scene, possibly a VR or AR image. The method performed in the system 330 comprises the following steps. With reference to FIG. 2, the computer-implemented method comprises providing the point cloud, i.e. a plurality of data points representing a scene, step 210, as discussed above. The plurality of data points is associated with a volume so that each of the plurality of data points is within the volume. The point cloud is implemented as one or more files in computer readable memory, such as hard disk drives (HDDs) or solid state drives (SSDs), RAM, and so forth.

The method further includes forming a bearing layer, step 220, wherein the bearing layer may be understood as a structured point cloud. The volume containing the cloud is logically divided into spatial cells called voxels. A voxel is a portion of the volume containing the cloud, and thus may contain some points of the cloud. Some voxels may have no cloud points at all; such voxels may be deleted or otherwise excluded from processing. The points of the cloud are grouped on per voxel basis, so that the bearing layer includes a plurality of groups of data points. Each of the voxels is associated with one of the groups so that each of the points within said group is within the voxel associated with said group. In other words, the coordinates of each point are within the voxel; the points on borders between voxels may be treated dependent on the implementation. The bearing layer includes all or most points of the cloud. The groups of points are implemented as one or more files in computer readable memory.

At step 230 a plurality of point sets is formed, each set representing the scene at the particular level of detail (LOD). Multiple LODs are often used for representing landscapes or any other type of scene in which closer objects are presented with more details and more data points than objects that are farther away. The data of the point cloud is structured so as to allow visualization of the data with minimum distortion to its appearance. It can be reached by gradual generalization of point cloud and effective usage of an appropriate level of generalization when displaying a scene.

Each of the point sets formed during the step 230 are stored in computer readable memory. Assuming the cloud is sufficient for providing M levels of detail (LODs) and, correspondingly, M point sets, the step 230 of forming multiple sets may be implemented as follows.

In one embodiment, forming LOD layers happens simultaneously by distributing points from the bearing layer to the LOD voxels (up and down) until the pre-defined average number of points is reached. While a voxel in the bearing layer contains more points than the predefined number ($P_{ijk} > P_v$, wherein $P_{ijk}$ is a number of points within said voxel of the bearing layer), $Q = P_v/8^T$ points are randomly selected from the group of points associated with said voxel and moved to a respective voxel of $LOD_T$. The process repeats for all LOD levels (T=1 ... M) from the same voxel of the bearing layer, so that after each operation the number of points in that voxel, more precisely in the group of points associated with the voxel, is reduced by Q. As soon as $P_{ijk} \leq P_v$, the process continues from a next voxel of the bearing layer. In one embodiment, a predefined pattern may be used for selecting points from the bearing layer into group of points associated with a particular LOD.

In one embodiment the LODs forming step 230 becomes a sequence of M steps 240 of forming a point set associated with a particular $LOD_T$, wherein T is an integer LOD index T=1, ... M.

At a particular LOD step 240, a new plurality of voxels, which are small cells of the volume, is associated with said LOD. Notably, the size of voxels changes with the change of the level of detail. The point set associated with said LOD is formed of a plurality of groups of data points associated with said LOD, except, possibly, the least detailed $LOD_M$ where the set may include a single group of data points associated with the voxel equal to the entire volume. Each of the groups of points is associated with one of the plurality of voxels, so that each of the points within said group is within the voxel associated with said group.

The groups of data points are filled with points by moving or copying those points from the bearing layer, or inserting references to the points stored elsewhere, taking into consideration which voxels of the bearing layer occupy a same space as the particular voxel associated with the group being filled in $LOD_T$. Where it does not cause uncertainty, the term LOD may refer to a level identified by the index T, as well as to the data set associated with the particular level and including the voxels associated with the LOD and groups of data points associated with the voxels.

During the step 240, the process of forming the point set comprises random or pseudo-random selection of points from groups of data points associated with voxels of the bearing layer into the group of data points associated with a particular voxel associated with $LOD_T$. The bearing layer is modified so as to remove, or mark as no longer available for selection, the points selected for inclusion into the point set associated with $LOD_T$.

After the data of the point cloud is structured into the bearing layer and point sets associated with multiple LODs, portions of the structured data may be provided to a viewing device and displayed to a user, wherein only a portion of the data is displayed at a particular moment. The structured data in the form of LODs may be stored in non-transient computer readable media, such as HDDs, SSDs, flash drives, DVDs, and distributed separately from the viewing device (s). In particular, a same set of LODs may be prepared and distributed to a variety of devices for viewing. At the same time, a single viewing device may have access to a variety of LOD sets from a library of scenes available to a user.

A combination of all the voxels associated with LODs T=1 ... M forms a logical pyramid. The pyramid may also include voxels associated with the bearing layer, which may be considered to be $LOD_0$ (T=0). The pyramid may be understood as formed of layers, each associated with a particular LOD and including all the voxels of that LOD and data points within those voxels.

A number of voxels associated with one LOD is different from a number of voxels associated with another LOD. In most cases, i.e. for the inner part of the pyramid, a voxel of a lesser resolution (higher index) LOD occupies a same portion of the volume containing the cloud as two or more voxels adjacent to one another and associated with another LOD having a higher resolution and associated with the lower LOD index T. In the 3-dimensional space, each inner voxel of the pyramid may occupy a same space as $n^3$ voxels associated with a LOD different from the LOD associated with said inner voxel, wherein n is an integer, n>1. In the preferred embodiment in the 3-dimensional space, an inner voxel of $LOD_T$ occupies the same space as 8 voxels of $LOD_{T-1}$.

Forming of the bearing layer is discussed below in more detail.

The bearing layer may be implemented as a plurality (d-dimensional array) of voxels, each associated with a group of points from the cloud. The points of the cloud may be rearranged in the computer memory, so as to fill the groups of points associated with the voxels. Alternatively pointers or other mechanisms are used to arrange the points. The groups may be implemented as one or more files, data structures, arrays, etc. The term "bearing layer" is different from a geometrical 2-dimensional layer. In 3-dimensional examples, the bearing layer contains a 3-dimensional structure of voxels, wherein each voxel is a 3-dimensional cell containing a group of points, each characterized by their spatial coordinates and associated with a value, such as intensity, color, etc.

The voxels may take a variety of shapes, such as cubes, parallelepipeds, sectors in polar coordinates, etc.

The volume containing the point cloud may be automatically divided into voxels using various techniques and predefined parameters. In one embodiment, $P_0$—an initial average number of points per voxel in the bearing layer—is predefined. In another embodiment, the size of voxels in the bearing layer is predefined, thus indirectly defining an average number of points per voxel. Of course, the actual number of points $P_{ijk}$ in each particular voxel $V_{ijk}$ may be different from the predefined average value.

The method will further be disclosed for a 3-dimensional space, though it may be used in 2-dimensional coordinates.

For forming the bearing layer, the total volume containing preferably all or at least most of the points is logically divided into a plurality of voxels (3-dimensional cells).

By way of example, the volume containing all or at least most of the points of the point cloud may be a parallelepiped $[X_{min} < x < X_{max}, Y_{min} < y < Y_{max}, Z_{min} < z < Z_{max}]$. It may be divided onto a 3-dimensional framework of voxels $[V_{ijk}]$, i=1 . . . I; j=1 . . . J; k=1 . . . K. Voxels may be same-size cubes with edges h selected so that the voxels $[V_{ijk}]$ contain on average a predefined number of points $P_0$ per voxel, and so $$P_0 * I * J * K = P, \quad (1)$$

and $$h^3 * I * J * K = V, \quad (2)$$

wherein V is the volume of the parallelepiped containing the cloud.

Using conditions (1) and (2) as an initial estimate for h, the value of h may be reduced so that the number of voxels along the longest side of the parallelepiped be a power of 2:

$$MAX(X_{min} - X_{max}, Y_{min} - Y_{max}, Z_{min} - Z_{max})/h = 2^N,$$

wherein N is an integer. The numbers of voxels along two other sides of the parallelepiped is calculated so that the voxels are cubes with all edges h, or those numbers may also be powers of 2 so that the voxels are not necessarily cubes. Having one or more of the numbers as powers of two simplify the process of combining voxels of the bearing layer into bigger voxels of LODs. On the other hand, it is preferable to have voxels in the form of cubes for more uniform distribution. Alternatively, the voxels are another regular shape such as a pyramid. Voxels which have no cloud points at all and may be deleted or otherwise excluded from further processing.

The voxels of the bearing layer are filled with points from the cloud by examining coordinates of each point and moving it to a group of points, based on the coordinates of the point. In other words, the bearing layer is formed of groups of points from the original cloud; each of the groups is associated with a particular voxel so that the points of the group are within the voxel. The groups of points may be implemented as one or more files, data structures, or arrays, etc. The process described is fully automated, i.e. performed by a computer, though human direction, for example, providing seed information, may be used.

Optionally, the number of points in the bearing layer is reduced by filtering. For example, each voxel is limited to contain no more than a predefined number of points. Alternatively, a point is not added to the bearing layer from the cloud when the point is within a predefined vicinity of another point already present within the bearing layer.

To summarize, in the bearing layer step 220, the points from the original point cloud file are distributed among the voxels $[V_{ijk}]$. The distribution process includes reading a point from the cloud memory location, determining a related voxel, optional filtering, and—if the point is not filtered out—moving the point into the group of points associated with the particular voxel. Moving of the points may be implemented as making, at another memory location, a copy of or a reference to a point in the cloud. In the computer memory, the order of points within a voxel is not important.

The formed plurality of voxels $[V_{ijk}]$ is referred to as "a bearing layer." It serves as a fulcrum structure that will be used for further pyramid generation.

After the data points of the cloud have been grouped into voxels of the bearing layer, more precisely into groups of points, each associated with a particular voxel, it becomes possible to build the pyramid of LODs, step 230.

Building each particular LOD, step 240, comprises building a framework of voxels, wherein each voxel of T-th LOD occupies same portion of the volume containing the cloud as one or more voxels of $(T-1)^{th}$ LOD. Preferably, internal voxels, i.e. those not at the edge of the cloud and not at the top $M^{th}$ LOD, each cover the same space as $2^d$ voxels of the previous LOD, where d is the dimensionality. In the 3-dimensional space, each inner voxel of a T-th LOD occupies a same portion of the volume as 8 voxels of $(T-1)^{th}$ LOD.

In a less preferable embodiment, the relationships between inner voxels of neighboring LODs may be not 1:8, and any rule for fitting several voxels into one in a next LOD may be employed.

Figure 3:
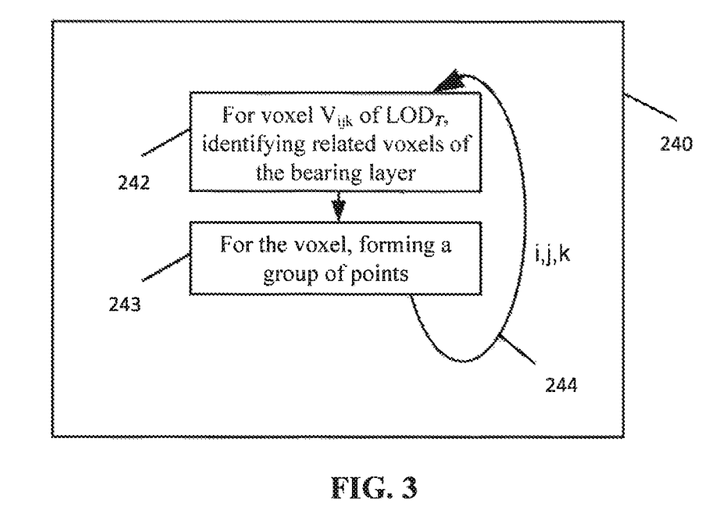
FIG. 3 is a flow chart of a method for building a point set associated with a particular LOD.

The process of building the point set associated with a particular LOD may be implemented as illustrated in FIG. 3. The T-th LOD building step 240 comprises, for each voxel of $LOD_T$, identifying related voxels of the bearing layer, step 242, and moving or copying some of the points from those identified voxels of the bearing layer into the data set associated with the voxel being formed, step 243. The arrow 244 indicates the repetition of steps 242 and 243 which should be performed for each particular voxel of the T-th LOD. Preferably, the points are moved in the sense that, if a point is selected for a particular LOD, the point is no longer present in the bearing layer and other LODs. Advantageously, the so created LODs are complementary to one another. Therefore, it is possible to increase the resolution of the image by including points of complementary LODs. Furthermore, the points are selected randomly (or pseudo-randomly) so as to avoid errors caused by the selection pattern.

In a 3-dimensional embodiment, with for example cubic voxels, the number of voxels per extent in the T-th LOD may be about half of the voxels per extent in the underlying $(T-1)^{th}$ LOD, and an inner voxel of the T-th LOD may be formed by joining 8 adjacent voxels of $(T-1)^{th}$ LOD and have the size of 2 voxels along each of the X,Y,Z coordinates.

In one embodiment, the size and boundaries of all voxels in all LODs are calculated first, and then the point sets associated with the voxels may be formed and filled with points of the bearing layer.

For any implementation, it is preferable to carry out the distribution of points to LODs separately for each LOD, directly from the bearing layer, and on per voxel basis. It results in complementary data sets, wherein points of one LOD are not repeated in another LOD, and also allows for parallel processing.

The method disclosed herein is characterized by a fully automated approach for creating the LOD structure for the point cloud, without any distortion, averaging, or aggregation of original points. For the embodiments where points are moved and not copied from the bearing layer to the LODs, the method maintains or reduces the size of the resulting LOD-structured file(s) in comparison with the original file(s) of the cloud, so that the total number of points in the point sets associated with all the LODs is not greater than P— the number of points in the original point cloud.

The process of filling a particular data group, step 243, preferably includes random selection of data points from related voxels of the bearing layer into the group. The selection may be performed with a computer-based random number generator, and the term "random" includes pseudo-random selection. Some generators provide pseudo-random number sequences with substantially uniform distribution. All references in this disclosure to random selection of points include the possibility of pseudo-random selection. In one embodiment, a point is selected based on its ID number or position within the file or data structure associated with the voxel; the number/position/id of the point is defined by the generated random number.

The number of points in each particular voxel in LODs, i.e. in the group of data points associated with that voxel, may be limited to a predefined target number $P_v$ of points per voxel. Limiting the size of the data per voxel is convenient for allocating memory, for using memory buffers, etc. Of course, the number of points in a particular group may be less than $P_v$, e.g. when there are not enough points left to be chosen from within the bearing layer. Considering that most of the voxels will have $P_v$ points, the average number of points per voxel in LODs will be close to $P_v$.

Assuming that there are enough points in the bearing layer, the particular voxel of the T-th LOD may be filled by moving or copying Q points from each of the related voxels of the bearing layer. Moving of the points may be implemented as making, at another memory location, a copy of or a reference to a point in the bearing layer. The selected voxels of the bearing layer together occupy a same space as the voxel of the T-th LOD being filled with points. The number of points Q may be $P_v/2^{Td}$, wherein d is the dimensionality (3 in the preferred embodiment), and T is the LOD index, T>0.

The process of selecting points from a particular voxel of the bearing layer optionally stops either when the predefined number Q is achieved, or when the voxel of the bearing layer is thinned down to $P_v$ or less points. Preferably, the initial average number of points per voxel in the bearing layer $P_0$ is greater than the target number of points per voxel in the LODs $P_v$, so that points may be moved from the bearing layer to LODs, and the remnants of the bearing layer may be used as $LOD_0$. In one embodiment $P_0=P_v$. In another embodiment $P_0=2P_v$. The target number of points in a voxel $P_v$ may be in the interval of 10,000 to 100,000, related to the point cloud size and video card performance, though $P_v$ is not limited to this interval.

The LODs may be filled with points in parallel or consequently, one after another. The process of constructing LODs with T>0 optionally continues until each voxel in the bearing layer contains no more than $P_v$ points. Alternatively, the process may stop after a predefined number of LODs is built or a predefined resolution is achieved. Another condition for completing the process is reaching a LOD that has only one voxel.

Each data set of points (a particular LOD) may be in the form of one or more files or data structures and include points copied or moved from the bearing layer or references to such points. In one embodiment, a LOD is stored in computer readable memory as a file and includes points moved from the bearing layer. The points moved to the LODs may be deleted from the bearing layer.

Optionally, the pyramid is continued down from the bearing layer. Voxels of the negative LODs may be smaller in size than voxels of the bearing layer, and may be formed by dividing voxels of the bearing layer, e.g. into 8 voxels in case of the 3-dimensional embodiment having cubic voxels. For each layer T<0, the size of a voxel at the layer T−1 is 8 times less than the size of a voxel at layer with number T. The same number of points $P_v$ may be moved from the bearing layer to a voxel in $LOD_T$(T<0). The points may be randomly selected from a related voxel of the bearing layer and then confirmed to be within the smaller voxel of $LOD_T$.

Layers with a negative LOD index may be useful when at least some of the voxels of the bearing layer have the number of points significantly higher than $P_v$. Then there is an opportunity for providing a higher resolution for at least a portion of the scene. The LOD may represent only a portion of the scene where a better resolution is available. In other words, if after the upper layers of the pyramid (T>0) have been constructed and their points have been removed from the bearing layer, the number of points in a particular voxel of the bearing layer is greater than a predefined number, one or more LODs with negative indices may be constructed.

With reference to FIG. 1, portions of the structured data 340 in the form of LODs built as discussed above are displayed with the viewing device 360, which may be a headset. The user may see the image of the scene 310 at different angles and from different distances, as illustrated in FIGS. 4 and 5 with two virtual points of view 370 and 371.

Figure 4:
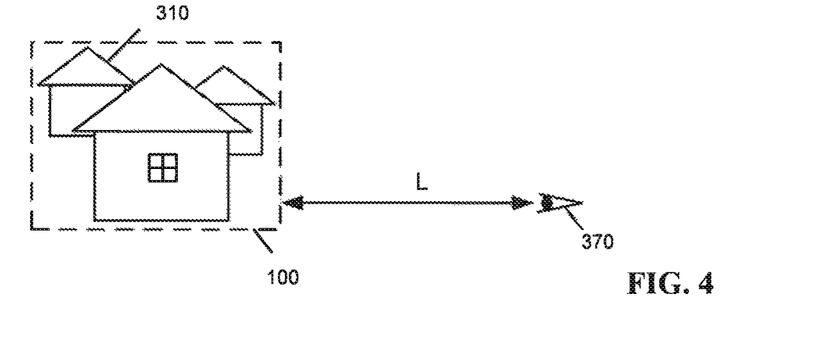
FIG. 4 is a schematic diagram of relative positions of the scene and a virtual observation point.

In FIG. 4, the virtual observation point 370 is far away from the scene, and the observer is unable to distinguish small details. Accordingly, only the least detailed LOD T=M is displayed in the viewing device. In other words, if a distance L between the virtual position of the observer or camera and the scene, more precisely the volume containing the point cloud representing the scene, is equal to or greater than the limit, a representation data set includes only the data associated with the least detailed $LOD_M$. The process of building the representation data set ends at this point, and it may be uploaded to the viewing device for displaying to a user.

Figure 5:
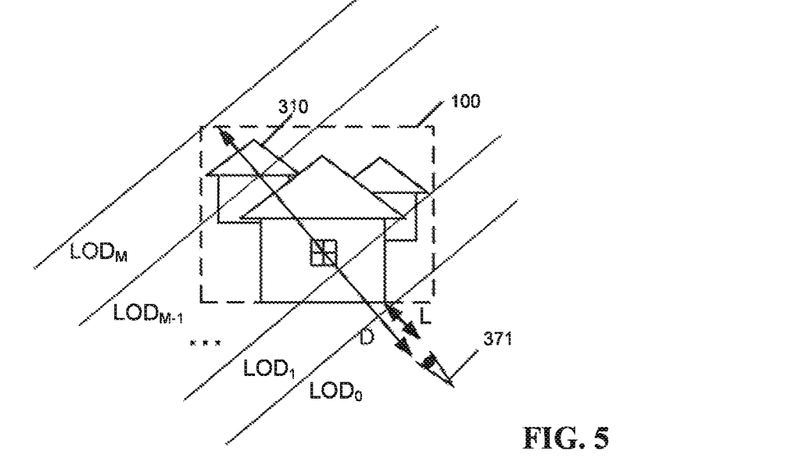
FIG. 5 is a schematic diagram of dividing the scene into portions to be displayed at different levels of detail.
Figure 6:
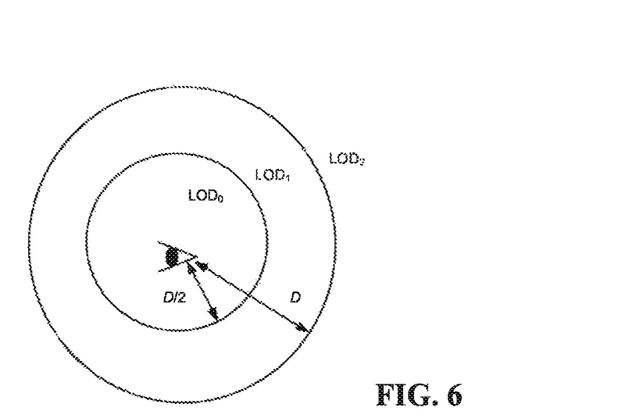
FIG. 6 is a schematic diagram of a viewing rule.

In FIG. 5, the virtual observation point 371 is closer to the scene, i.e. the distance L is less than the predefined limit, so that the observer can distinguish small details in the portion of the scene proximate to the virtual observation position. If the LOD set consists of LODs with T=0 . . . M, the space around the virtual observer point may be logically divided into M zones. Each zone may be associated with a particular LOD as illustrated in FIG. 6, wherein 0≤T≤2 for illustration purposes. A variety of formulae may be used for calculating an extent of a particular zone. The zones may be defined using a diagonal D which includes the distance to the scene L and the extent of the scene as shown in FIG. 5.

In one embodiment, the zones and related LOD levels are identified as follows. When at least a portion of the cloud-containing volume 100 is closer to the virtual observer than the predefined distance limit, the following viewing rule may be used. As illustrated in FIG. 6 for M=2, all voxels located closer to the virtual camera than D/M will be shown from the most detailed level of the pyramid ($LOD_0$ in this example) and all other less detailed levels ($LOD_1$ and $LOD_2$ in this example), voxels distanced between D/M and D/(M−1) from the next level ($LOD_1$) plus less detailed LODs, etc. In other words, voxels that are located at a distance between D/k and D/(k−1), k=M . . . 2 will be shown including voxels from the level M−k+1. Of course, other viewing rules may be employed. If the plurality of LODs includes LODs with T<0, the number M includes those LODs as well, and data from the negative LODs (T<0) is used from the portions of the scene most proximate to the virtual observer.

Figure 7:
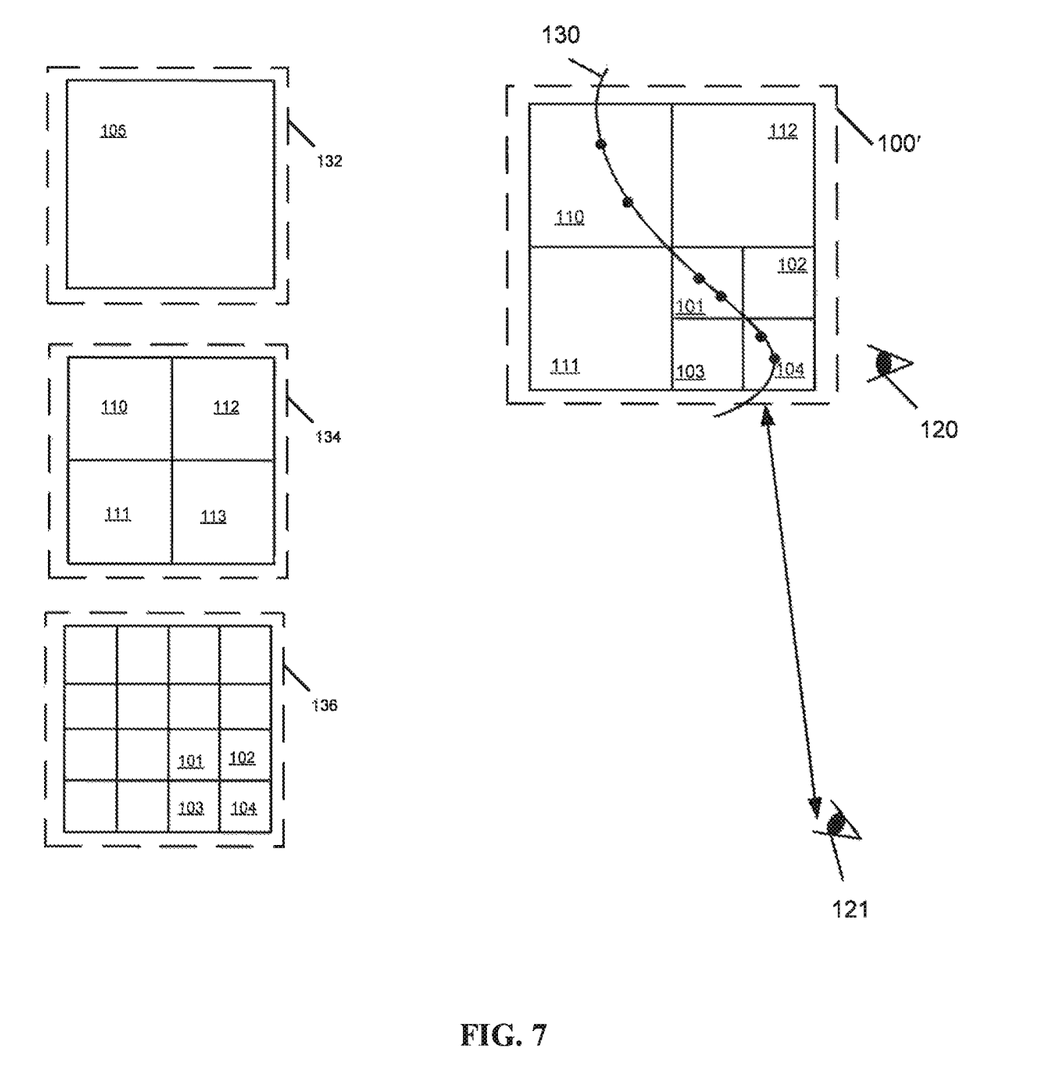
FIG. 7 is a schematic diagram of using a LOD pyramid for a two dimensional case.
Figure 8:
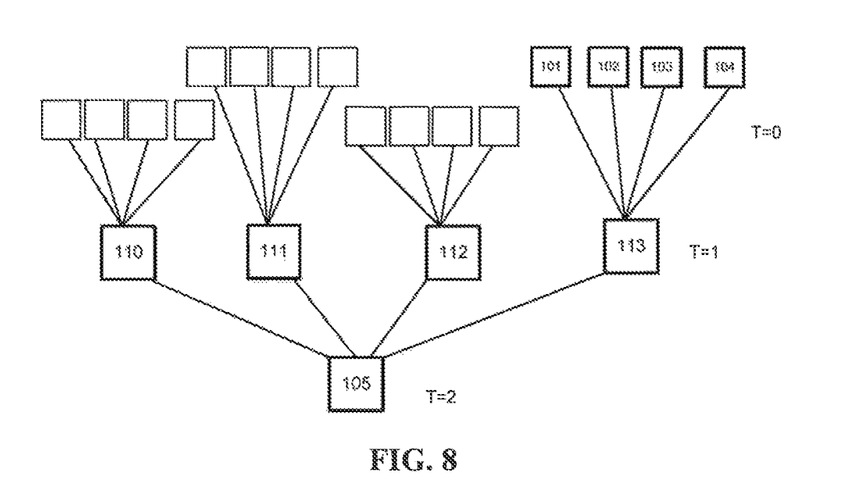
FIG. 8 is a visualization tree for the embodiment illustrated in FIG. 7.

The method of using the structured data for providing a virtual scene will be further explained with reference to FIGS. 7 and 8 illustrating a two dimensional case. A curve 130 represents a scene the same way as a 3-dimensional surface represents walls etc. of the houses shown in FIG. 1 as parts of the scene 310. The scene 130 is observed by a virtual observer or camera 120. The two-dimensional point cloud is contained within a volume 100'. The least detailed LOD 132 (T=2) has a single voxel 105, the next LOD 134 (T=1) has four voxels 110-113, and the most detailed LOD 136 (T=0) has 16 voxels including voxels 101-104. FIG. 8 illustrates the pyramid of voxels.

If the distance between the cloud-containing volume 100' and the virtual position of the observer is greater than a predefined distance limit, as for the observer 121, only data points of the least detailed LOD are displayed to the user using the viewing device. In this example, only points associated with voxel 105 of LOD 132 are displayed.

With reference to the pyramid of voxels (FIG. 8), the virtual position of the observer 120 is associated with a portion of the pyramid that may be referred to as a visualization tree. The assembled data includes the groups of points associated with voxel 105 of $LOD_2$, voxels 110-113 of $LOD_1$, and voxels 101-104 of $LOD_0$; the voxels forming the visualization tree are marked in the drawing by thick borders. Movements of the virtual observer relative to the scene would result in selecting a different visualization tree within the pyramid of voxels. For the viewing location 121, the visualization tree contains a single node, voxel 105.

In general, a visualization tree may have voxels as nodes, wherein each node may have multiple children. The number of children depends on how many voxels of one LOD are combined into a voxel of a next LOD. In the preferred embodiment, wherein inner voxels of the pyramid are formed by combining 8 voxels of a lower LOD, each inner node of the visualization tree has 8 children. Nodes at the edges of the volume containing the point cloud may have fewer children.

Figure 9:
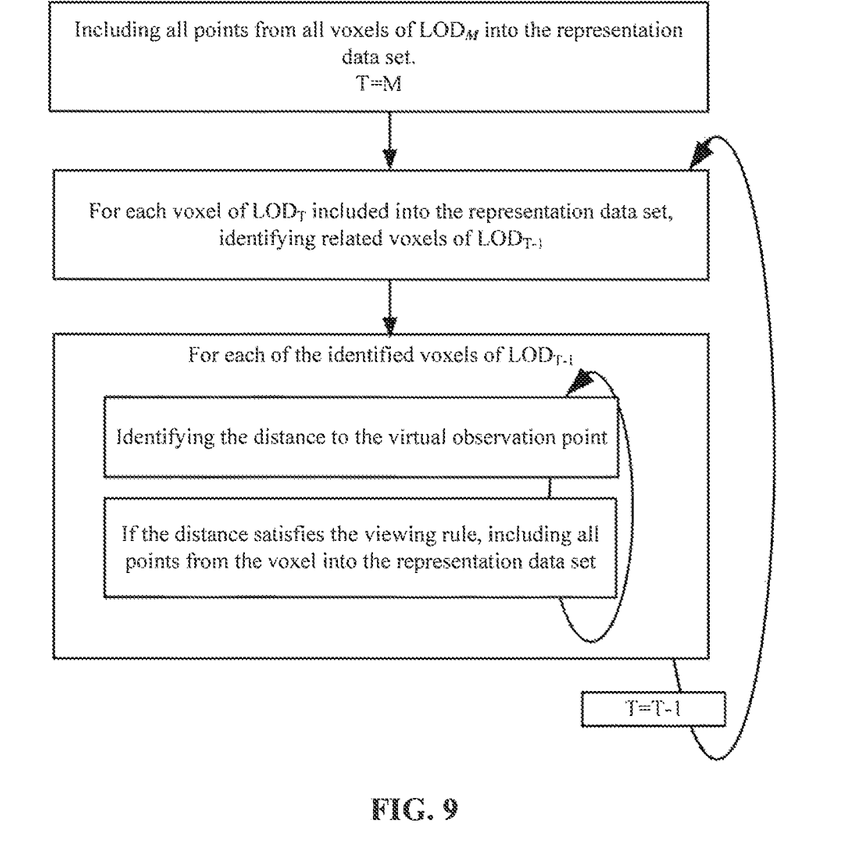
FIG. 9 is a flow chart of an implementation of a viewing method.

The method may be implemented as illustrated in FIG. 9. Starting at the least detailed level (T=M), all the points from voxels of $LOD_M$ are included into the representation data set. Then, recursively, for each voxel of $LOD_T$ (T=M, M−1, . . . ) with points already included into the representation data set, the computer evaluates all voxels of the lower level $LOD_{T-1}$ forming said voxel of $LOD_T$. The so-selected voxels of $LOD_{T-1}$ are evaluated whether they are sufficiently close to the virtual observation point in accordance to the viewing rule as discussed above. If a distance to a particular voxel of $LOD_{T-1}$ satisfies the viewing rule, the group of points associated with that voxel is included into the representation data set, which may be stored in computer memory and communicated to the viewing device. The procedure is recursive, so at the end all voxels that satisfy the viewing rule are included.

In one embodiment, the visualization tree may be built first, and then the representation data set is assembled using the tree. If the virtual position of the observer changes, a new visualization tree will be built using the same algorithm thus enabling dynamic rendering of the scene image.

In one embodiment, the lowest resolution $LOD_M$ is initially provided to a viewing device. On a zoom request, at least a portion of a higher resolution $LOD_{M-1}$ is provided to the viewing device, and so on, in accordance with the viewing rule as discussed above, so that the viewing device uses a combination of points of the two (or more) LODs for forming at least a portion of the image. In one embodiment, the LODs are combined within the viewing device. In another embodiment, the LODs are combined before the data is sent to the viewing device.

Alternatively, in a static rendering mode, the user can manually select a required level of detail. Since the pyramid is complementary, if the user selects a LOD with level T, all data from all voxels from less detailed LODs T+1, . . . M will be loaded and shown. For static rendering, the pyramid may be additive or complementary. In other words, all higher less detailed layers may be combined together in order to compile a more detailed layer.

Examples of viewing devices include 3-dimensional glasses, augmented reality viewing devices, VR headsets, smartphones, tablets, general purpose computers, etc. Devices or systems for forming holograms may also utilize the method disclosed herein. The viewing device may be in communication with a computer system wherein all the LODs data is stored, such as computer 350 (FIG. 1). Dependent upon the virtual position of the observer, the computer system provides the representation data set to the viewing device for displaying to the user. The representation data set may be sent to the device in its entirety or incrementally as discussed above.

Advantageously, the method disclosed herein may be generalized for processing of various types of spatial data including but not limited to meshes, point clouds, 2- and 3-dimensional raster data, graphs, and vector structures in a way which makes 3-dimensional spatial data files viewable at a device with limited video and random-access memory (RAM) resources whether the size of native 3-dimensional spatial data file repeatedly exceeds a device resources or not.

Independently of the spatial data type, the method for data visualization includes three consequent steps of data pre-processing and data access, which define basic principles of viewable spatial model construction and usability. The steps are: building one or more LOD sets so that, dependent on spectator's position across a 3-dimensional scene, the system may suggest the best possible representation of a scene from the appropriate LOD level; and, selecting a subset of the viewable model based on the LOD structure and a desired accuracy, and pushing it to the device.

We claim:

1. A computer-implemented method comprising:
   (a) providing a plurality of data points representing a scene, the plurality of data points stored in computer readable memory and associated with a volume, and each of the plurality of data points within the volume;
   (b) forming a bearing layer comprising a plurality of groups of data points stored in computer readable memory, each of the plurality of groups associated with the bearing layer and comprising some points from the plurality of data points, each of the plurality of groups associated with a first voxel of the volume, said first voxel associated with the bearing layer, and each point of said group within the first voxel;
   (c) forming a plurality of point sets, each stored in computer memory and associated with one of a plurality of levels of detail (LODs), for a particular LOD the point set associated with said LOD comprising a plurality of groups of data points associated with said LOD, each of the plurality of groups associated with one voxel of a plurality of second voxels of the volume, said one voxel associated with said LOD, each point within said group within the one voxel, a number of second voxels associated with one of the plurality of LODs different from a number of second voxels associated with another of the plurality of LODs, for each two of the plurality of LODs at least some of the second voxels associated with one of the two LODs each associated with a same portion of the volume as two or more second voxels adjacent to one another and associated with another of the two LODs,
wherein forming the plurality of point sets comprises random or pseudo-random selection of points from groups of data points associated with the bearing layer into the groups of data points associated with one of the plurality of LODs, wherein the bearing layer is modified so as to remove the points selected for inclusion into the plurality of point sets, wherein the pluralities of second voxels associated with the plurality of LODs form a pyramid; the pyramid comprises inner voxels, each associated with a same portion of the volume as $n^3$ second voxels associated with a LOD different from the LOD associated with said inner voxel, wherein n is an integer, n>1, and
wherein the random or pseudo-random selection of points into a particular group of data points comprises selection of no more points than a predefined number of points, same for all groups and all LODs.

2. The method defined in claim 1, wherein the groups of data points associated with the inner voxels, each have the predefined number of points.

3. The method defined in claim 1, wherein forming the bearing layer comprises filtering out points proximate to a previously selected point.

4. The method defined in claim 1, wherein forming the plurality of point sets comprises forming a point set associated with one of the plurality of LODs, wherein at least some of the second voxels associated with said LOD comprise two or more voxels associated with the bearing layer.

5. The method defined in claim 4, wherein forming the plurality of point sets comprises forming a point set associated with one of the plurality of LODs wherein at least some of the first voxels associated with the bearing layer comprise two or more second voxels associated with said LOD.

6. The method defined in claim 5, comprising storing the plurality of point sets in non-transient computer readable media.

7. The method defined in claim 5, wherein forming the bearing layer comprises using a predefined average number of points per first voxel in the bearing layer.

8. The method defined in claim 7, wherein a number of first voxels associated with the bearing layer along a longest extent of the volume is a power of two.

9. The method defined in claim 4, comprising forming a representation data set comprising points of at least some of the groups associated with a least detailed of the plurality of LODs.

10. The method defined in claim 9, comprising: for each second voxel associated with the least detailed of the plurality of LODs ($LOD_M$), evaluating a distance between a virtual position of an observer and said second voxel; if the distance is less than a predefined limit: (a) identifying second voxels associated with a more detailed of the plurality of LODs ($LOD_{M-1}$), forming said second voxel of $LOD_M$, and (b) for each of the identified second voxels associated with $LOD_{M-1}$, including a group of data points associated with said second voxel into the representation data set.

11. The method defined in claim 10, comprising using a viewing rule so as to recursively identify groups of data points for inclusion into the representation data set.

12. The method defined in claim 11, comprising storing the representation data set in non-transient computer readable media.

13. The method defined in claim 11, comprising providing the representation data set to a viewing device and displaying the scene.

* * * * *